Feb. 7, 1939.  B. N. FOSTER  2,145,977
SOLENOID ACTUATED VALVE
Filed June 11, 1936  3 Sheets—Sheet 1
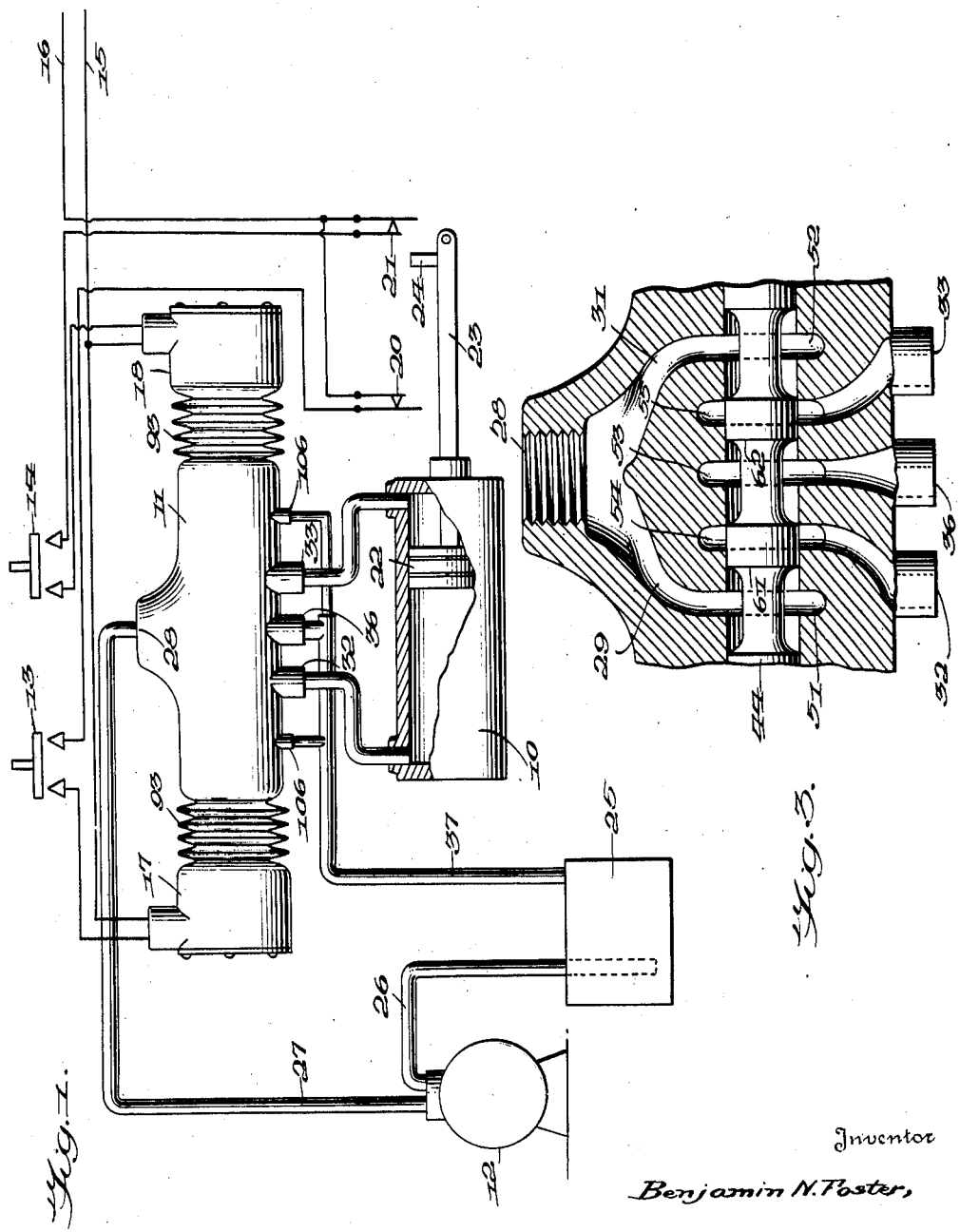
Inventor
Benjamin N. Foster, Feb. 7, 1939.  B. N. FOSTER  2,145,977
SOLENOID ACTUATED VALVE
Filed June 11, 1936  3 Sheets-Sheet 2
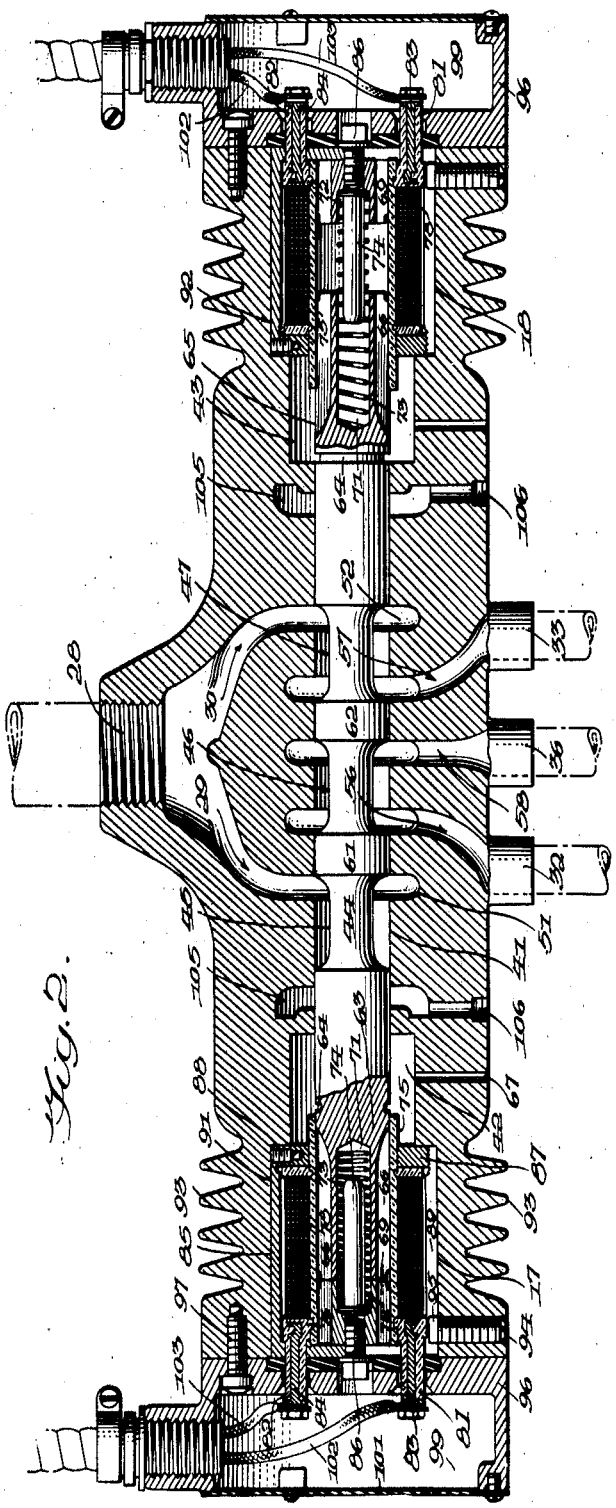
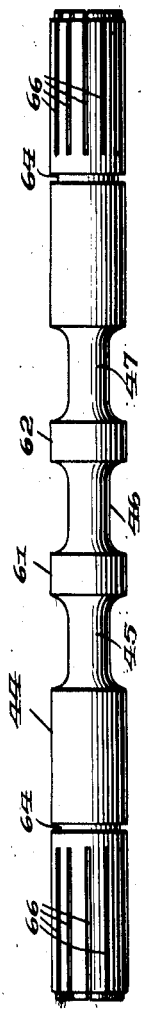
Inventor
Benjamin N. Foster,
By
Attorneys.

Feb. 7, 1939.　　　　B. N. FOSTER　　　　2,145,977
SOLENOID ACTUATED VALVE
Filed June 11, 1936　　　　3 Sheets-Sheet 3
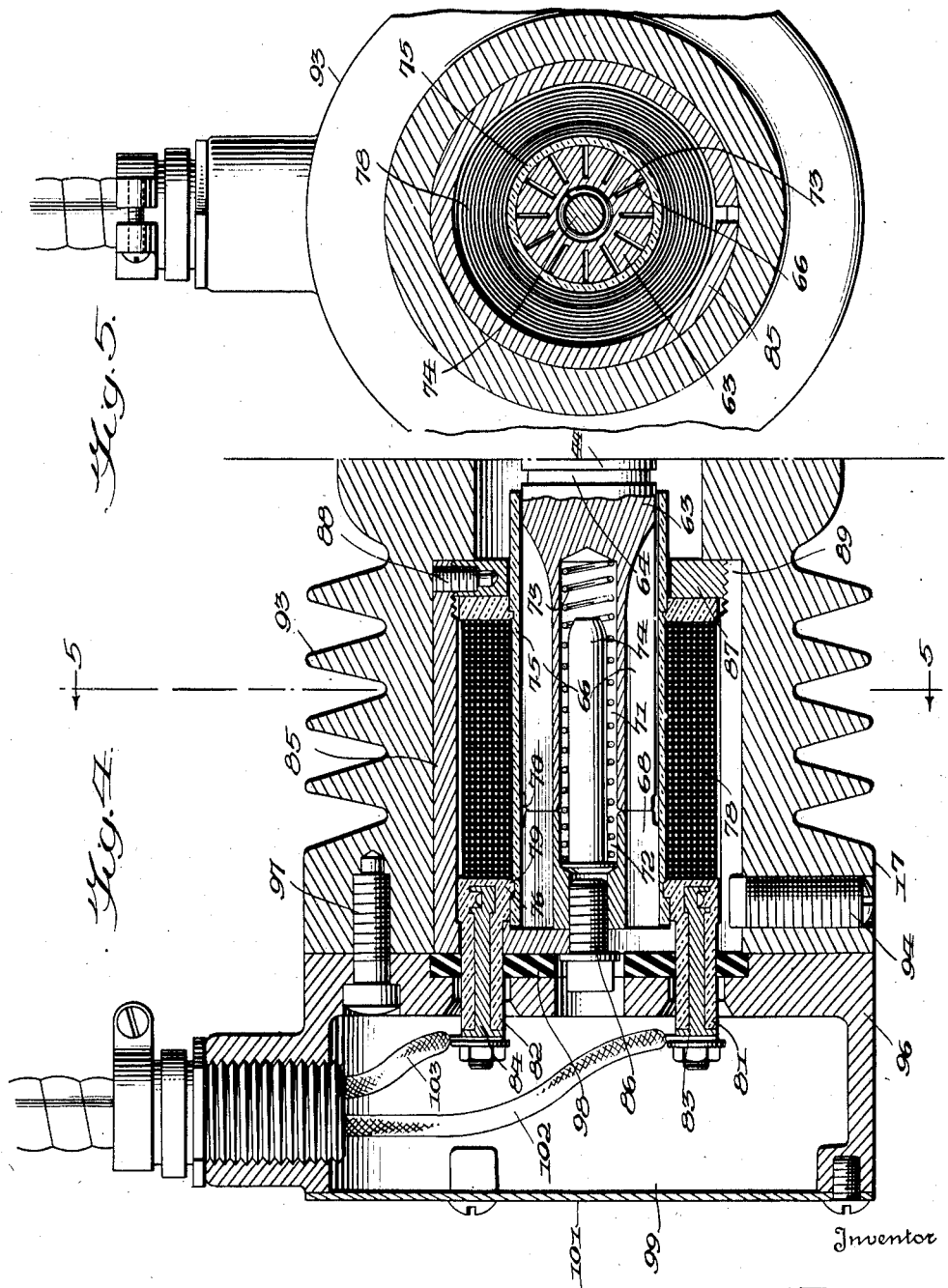
Inventor
Benjamin N. Foster,
By [signature]
Attorneys.

UNITED STATES PATENT OFFICE 2,145,977

SOLENOID ACTUATED VALVE

Benjamin Norton Foster, Keene, N. H., assignor to Kingsbury Machine Tool Corporation, Keene, N. H., a corporation of New Hampshire Application June 11, 1936, Serial No. 84,753

9 Claims. (Cl. 137—139)

This invention relates to balanced valves more particularly to what is known as the spool-type pilot valve actuated by means of electromagnets or solenoids and particularly adapted to control fluid motor actuated devices by the closing and opening of electrical circuits.

The primary feature of this invention is the embodiment of a pilot or control valve and actuating solenoid plungers in a unitary structure housed with the actuating solenoids in a single casing.

The principal object of the invention is the provision of a unitary member embodying both the valve and the solenoid plungers and incorporating the characteristics desirable for both elements.

Another object is to combine the operating features of a cylindrical type balanced valve and two oppositely disposed solenoids in a simplified structure employing the minimum number of parts.

Another object is to provide a self-centering valve which in this position will close all fluid passages controlled by the valve so that the flow of fluid to the controlled device will be cut off when neither solenoid is energized.

A further object is to provide improved means for dissipating heat from an incased solenoid structure.

A still further object is to provide means for assuring fluid isolation of the valve portion of the valve member from the solenoid plunger portion.

These and other objects will be apparent from the following description taken together with the accompanying drawings of an illustrative embodiment of the invention in which:

Fig. 1 is a diagrammatic illustration of a complete operative system embodying the invention;

Fig. 2 is a diametrical sectional view of the valve casing and the operating solenoids;

Fig. 3 is a fragmentary view showing the valve elements aproaching a centralized position;

Fig. 4 is an enlarged sectional view of one of the solenoids;

Fig. 5 is a section along line 5—5 of Fig. 4; and,

Fig. 6 is a view of the valve member including the plungers.

The present invention is adapted primarily to the control of pneumatically positioned or operated devices such as are employed in connection with the control and operation of machine tools. The invention is designed to be constructed as a single unit which may be mounted in any suitable position without special provision with regard to its proximity to large metallic structures, either from the standpoint of the magnetic action of the solenoids or the dissipation of heat therefrom.

The type of solenoid employed in this invention embodies many of the features described and claimed by me in a prior Patent No. 1,987,555 granted January 8, 1935.

Referring now to the drawings, Fig. 1 shows diagrammatically a complete operative unit embodying the invention. The principal elements of the unit are fluid pressure motor 10 which may be connected to actuate any suitable portion of a machine tool structure or like apparatus, casing 11 incorporating the pilot valve and its operating solenoid, a source of fluid pressure 12, and pilot valve control or tripping switches 13 and 14. Current, which in most cases will be alternating current, may be supplied by power leads 15 and 16. Lead 15 may be connected directly to the windings of pilot valve actuating solenoids 17 and 18. These connections are illustrated in detail in Figs. 2 and 4. The other lead, 16, is preferably connected through limit switch 20 and tripping switch 13 to the other side of the winding of solenoid 17. This lead is also connected through limit switch 21 and tripping switch 14 to the other side of the winding of solenoid 18.

The piston 22 of the motor 10 is connected by means of a piston rod 23 through suitable linkage, not shown, to device to be operated. A striking piece 24 projecting from the piston rod operates to open switch 20 as it approaches its full inward position thus breaking the circuit to solenoid 17 permitting the pilot valve enclosed in casing 11 by virtue of its self-centering feature, which will presently be described in detail, to cut off the flow of fluid to the motor stopping the inward movement of the piston rod. As the piston rod 23 moves outwardly, the striking piece 24 opens the limit switch 21 as the rod approaches its full outward movement opening the circuit to solenoid 18 and in like manner stops the outward movement of the piston.

Referring to Figs. 1 and 2 taken together, the pressure or operating fluid circuit will be traced. A sump 25 serves as a fluid supply from which the pump 12 draws fluid through line 26 and forces it out through line 27 to the inlet port 28 of the casing 11. From this port it is distributed through right and left passages 31 and 29 to fluid transfer ports 32 and 33 respectively. The transfer port 32 is connected through a suitable line 34 to the piston chamber in motor casing 10 at a point to the left of the piston 22. The other transfer port 33 is similarly connected through line 35 to the piston chamber at a point to the right of piston 22. The fluid transfer ports 32 and 33, through the action of the pilot valve, as will hereinafter be seen, are connected alternately to a central exhaust port 36 so that, as fluid is admitted to one side of the piston, it may escape from the opposite side. Port 36 is connected through a sump line 37 for the exhaust of the spent fluid to the supply sump 25.

The manner in which pressure fluid is distributed by the pilot valve incorporated in casing 11 to accomplish the control of a machine element actuated by motor 10 will now be described in detail. The casing 11 is provided with a centrally located bore 41. This bore is preferably cylindrical and extends from recess 42 at the left end of the casing to recess 43 at the right end of the casing. A cylindrical valve member 44 is fitted to extend through the bore 41 and to be reciprocated therein. The intermediate portion of the member 44 is formed to embody what is known as spool or balanced valve elements to accomplish the fluid distribution. The valve elements are formed by turning down suitable lengths 45, 46, and 47. The action of the pressures against equal and opposite shoulders at the ends of these reduced portions to produce a balance valve effect is well known.

In the casing 11 pressure fluid passages 29 and 31 terminate in annular pressure passages 51 and 52 surrounding the bore 41. These passages are spread apart longitudinally of the bore sufficiently to space therebetween three similar passages, a central exhaust passage 53 and two transfer passages 54 and 55. All of the annular passages are preferably equally spaced at a distance having a ratio to their width of substantially 5 to 3. The passages 54 and 55 are joined through connecting passages 56 and 57 to the transfer ports 32 and 33 respectively. The passage 53 is similarly joined through a connecting passage 58 to exhaust port 36.

The turned down or reduced portions 45, 46, and 47 are merged by an arcuate fillet formation with the full diameter of the cylinder to form spool-like head member 61 between the portions 45 and 46 and head member 62 between portions 46 and 47. The length of the reduced portions are substantially the same and from shoulder to shoulder are substantially equal to the width of an adjacent pair of the series of equally spaced annular passages 51 to 55 plus the distance separating them. On the other hand, the width of the valve head sections 61 and 62 are made equal to the distance separating two adjacent annular passages. From the relation of the width of the annular passages to their separating distances already indicated it will be seen that the width of the valve head section is greater than the width of the annular passages. In other words, when the valve member is positioned so as to span two passages with one of the reduced portions, the opposite shoulders thereof substantially coincide with the outward boundaries of two adjacent passages while the adjacent head member substantially coincides with the separating space between two other passages.

This relationship is illustrated by the position in which the valve element is shown in Fig. 2. The valve element is shown in its extreme left position. In this position the annular passage 51 is cut off, and the annular passages 52 and 55 are spanned by the reduced section 47 connecting the pressure fluid entering port 29 with the transfer port 33 and through the connecting line 35 (Fig. 1) with the right side of piston 22 of motor 10. In similar manner passages 53 and 54 are spanned by the reduced section 46 connecting ports 32 and 36 which through line 34 (Fig. 1) connects the left side of piston 22 with the exhaust line 37. With the valve in the position shown pressure fluid will enter at right of piston 22 while the fluid at the left of the same will be exhausted to sump 25.

When the valve member 44 is moved to its extreme right position, the pressure passage 52 will be cut off and the pressure passage 51 connected with the transfer passage 54, port 32, and line 34 to the left of the motor piston 22 while the transfer passage 55 will be connected with the exhaust passage 53 permitting the fluid at the right end of the piston 22 to exhaust through the line 35.

In Fig. 3 the valve element 44 is shown approaching a centralized position from its extreme left position. As the valve approaches this position, a complete cut off of the transfer passages 54 and 55 is accomplished. This takes place as soon as the right shoulders of the head members 61 and 62 reach the right edges of the transfer passages 54 and 55 respectively. It will be seen from the illustration that this condition takes place before the valve reaches its dead center position. This arises from the width of the head portions as compared with the width of the annular passages which as already indicated may be on the basis of a 5 to 3 ratio. It is obvious that the same cut-off condition would occur with the element approaching the dead center with the leftward movement from its extreme right position.

The result of cutting off the transfer passages 54 and 55 is to stop the movement of the piston 22 of the motor 10 at the point in its stroke when this condition occurs and to hold the piston in such a position as long as the valve member is maintained in substantially the centralized position.

Referring particularly to Figs. 2, 4, 5, and 6 it will be seen that the valve element 44 has its opposite extreme ends formed as plungers for the solenoids 17 and 18. At the left end of the element 44 a plunger 63 is formed. Although the plunger portion may be regarded as the part extending beyond the annular groove 64, there is no definite line of termination of the magnetism of the valve element by the action of the solenoid on the plunger. A similar plunger 65 is formed at the opposite end of the valve 44 extending beyond a like annular groove 64 at that end. Both these plunger portions are preferably slotted longitudinally at a number of places as shown in Fig. 5 to provide kerfs 66 which serve to interrupt electrical circuit paths for eddy current. While these kerfs are illustrated as having the same depth, it may be desirable under certain conditions to extend one of the kerfs to the central core of the plunger.

As the plunger ends reciprocate back and forth in the recesses 42 and 43, there is a displacement of the air in these recesses. In order to prevent pressure differences which might tend to draw fluid along the valve member 44 breather passages 67 are provided to connect the recesses with atmosphere.

In order to give the plunger elements the desired qualities, particularly for use in connection with alternating current, they should be composed of a material having the general characteristics of high permeability and low hysteresis factor. These characteristics are most readily available in soft iron or soft iron alloys. From the standpoint of manufacture, however, it is highly desirable that the plunger ends and the intermediate valve section be formed together from a single piece of stock. On the other hand, soft iron alloys do not present a wearing surface having suitable hardness.

This difficulty has been overcome, according to this invention, by forming the valve member 44 from a single piece of material having the characteristics desirable for the solenoid plunger ends then forming a suitable wearing surface on the member by the application thereto of a plating of hard metal such as chromium. The diameter of the member may first be reduced at the wearing surfaces to allow for the thickness of the plating. This method of construction gives the surface desirable wearing qualities without interfering with magnetizable characteristics which the member requires to permit its ends to best serve as solenoid plungers.

A pole piece or stop member 68 in each of the substantially identical solenoids 17 and 18 is provided with kerfs 69 similar to the kerfs of the plunger ends. Both the plunger and pole piece are provided with center cavities 71 and 72 for receiving a plunger expelling spring 73. The walls of these cavities serve to house this spring when the plunger is against the pole piece and form a magnetic shield thereabout to protect it from eddy currents which might be induced therein to weaken or modify its elastic property. The walls of the cavity serve further in connection with the pin 74 to guide the spring during the movement of the plunger to and fro in the solenoid. The springs 73 at the opposite ends of the valve element operate in opposition to each other and act to centralize the valve when both solenoids are deenergized by expanding until their forces are substantially equalized. However, as shown in Fig. 3, due to the fact that the valve head portions 61 and 62 are substantially wider than the passages which they cover at the central position, it is not necessary that the valve member reach a dead center position to accomplish fluid cut-off. In other words, as soon as the position of the valve falls within a central area determined by the points at which cut-off is accomplished by the approach of the valve member to central position from either direction, the effect of centralization is obtained. This makes for the effective accomplishment of cut-off by the use of plunger expelling springs 73 acting upon the valve member in opposition to each other.

Since the solenoids 17 and 18 are substantially identical, a description of one will apply to the other and the same reference character is given to like parts of both. Each solenoid proper comprises a plunger-receiving sleeve 75 preferably of a nonmagnetic material such as phosphor bronze or the like. The plunger 63 preferably is sufficiently reduced in diameter to provide surface clearance between it and the sleeve. In this manner the bearing or wear surface of the entire valve member is limited to the core engaging portions permitting the plungers to float in the solenoid sleeves eliminating the possibility of bearing difficulties at this point due to heat expansion or absence of lubrication.

The plunger sleeve 75 at each end extends back along the corresponding plunger with a skirt portion such a distance that the end of the entire sleeve is further back than the ends of the kerfs 66 when the plunger is pulled up to the pole piece 68 but not so far back as the ends of the kerfs when the plunger is out. With this arrangement air escapes through the kerfs as the plunger is drawn inwardly until the kerf ends pass within the skirt portion. Thereafter it is trapped in the kerfs and ahead of the plunger end, except for the small amount escaping through the surface clearance area, just described, and forms a dashpot effect which tends to cushion the plunger at the end of its stroke. After completion of the stroke the air escapes through the surface clearance area and to the atmosphere through breather passage 66. On the outward stroke of the plunger the air reenters the space between the plunger and the pole piece as soon as the kerfs pass out the end of the skirt portion, having been admitted through the breather passage 67.

It is preferred to cut away the abutting edges of the plunger and pole piece to provide recesses 70 which receive any oil or dirt which may be scraped from the internal wall of the winding sleeve 75, and thus permit the armature to come into abutting relation with the stop member or pole piece 68.

A portion of the sleeve 75 constitutes the winding sleeve of the solenoid. At the opposite ends of the winding space coil heads or collars 76 and 77, preferably of insulating material, are secured to the sleeve and serve during the preliminary assembly to retain a coil 78 as it is being wound. These collars may be made of a plastic composition and moulded in place and held by being set in annular recesses 79 and 80 provided for that purpose. The collar 76 at the outer end of the sleeve has stems 81 and 82 moulded integral with the collar and in which conductors 83 and 84 are embedded to form terminals for the solenoid winding 78.

The coil sleeve assembly is housed in a shell 85 of magnetizable material and is provided with a smooth outer surface which may be cylindrical. The shell is closed at the outer end except for openings through which a screw 86 passes for holding the pole piece 68 in place and openings for the stems 81 and 82. The open inner end is provided with screw threads to receive a closing and winding sleeve securing plug 87. The outer end of the winding sleeve 75 is secured in a recess in the head of the shell while the inner end is secured in the central opening in the plug 87. The sleeve is held tightly in position by the action of a face of the plug in engaging the outer face of collar 77 as the plug is screwed into the shell and which carries collar 76 firmly against the head of the shell binding the assembly between these two points. When the plug is in place, the shell and plug may be tapped for a locking screw 88. The shell 85 may be provided with a kerf 89 extending from one side to the center for interrupting the path of eddy currents.

The solenoid assembly 17 is housed in the left end of the casing 11 a suitable distance beyond the end of the bore 41 in an enlarged receiving portion 91 of the recess 42. In this recess the solenoid is held with the plunger receiving cavity of the winding sleeve 75 in exact alinement with the bore 41. In like manner the solenoid assembly 18 is housed in an enlarged portion 92 of the recess 43.

The smooth outer surface of the shell 85 is fitted into its receiving recess with firm metal to metal contact so that heat generated in the solenoid may be readily conducted by the shell to the surrounding portion of the casing 11. In order to facilitate the dissipation of this received heat to the air or other surrounding medium, heat radiating fins 93 are provided in the outer surface of the casing adjacent the solenoid. With good metal to metal contact the heat is conducted to the radiating fins with substantially the same rapidity as if solenoid shell and valve casing were a unitary piece. On the other hand, this construction enables the use of a solenoid shell having desirable magnetizable qualities while the enclosing casing may be made of material such as cast iron or other material in which the magnetizable qualities are inconsiderable. This construction also decreases the difficulty otherwise due to stray magnetic fields.

The solenoid assembly may be held against rotation in its receiving recess by the use of a lock screw 94 engaging a socket 95 in the shell. A cap 96 is fitted to the end of casing 11 for enclosing the solenoid assembly in the recess 91 or 92. Preferably the cap embodies a recess for receiving a plate or disc 98 of insulating and resilient material such as synthetic rubber which is fitted against the end of the solenoid for service as a recoil pad for absorbing the shocks of impact of the plunger against the corresponding pole piece, and thereby prevent fatigue of the metal parts. Synthetic rubber is preferred for this purpose over actual rubber, owing to its greater resistance to the deterioration effects from heat and oil. Both this plate and the cap embody openings through which the stems 81 and 82 extend.

The cap 96 is preferably provided with a chamber 99 made accessible by a cover plate 101. At one side of this chamber may be connected an armored cable containing current leads 102 and 103 which are connected to the terminal conductors 83 and 84. One of the leads, 102 or 103, is connected directly to the power lead 15 (Fig. 1) while the other lead is connected through one of the tripping switches 13 or 14 to an appropriate one of the limit switches 20 or 21.

At the other end of the valve casing 11 the other solenoid has one of its current leads connected to the other tripping and limit switches and the other lead connected to power lead 15.

Considering the valve casing 11 and the parts housed therein as a complete unit, it is to be observed that the casing includes areas in which the parts are subjected to a fluid under pressure and also areas in which the parts are preferably kept free from such pressure. In other words, the area in the casing including the valve element portions and the fluid passages carry a fluid under pressure, while the solenoid plungers, solenoids, and clearance recesses are not provided with any fluid for lubrication because by using plunger clearance this is not only unnecessary but the operation is better if only air is permitted to enter the solenoid area.

This is very effectively accomplished by the provision of annular recesses 105 near the outer ends of the bore 41 in conjunction with breather passages 67, already described. The recesses 105 are connected through drain passages 106 to the exhaust line 37 (Fig. 1) and act to drain any fluid which tends to travel toward the ends of the bore. However, for any fluid which is carried beyond the recesses by adhering to the reciprocating valve element the annular grooves 64 will form a barrier which will cause the fluid to flow along the walls of recesses 42 and 43 and be discharged through breather passages 66. Furthermore the use of breather passages prevents vacuum from being set up in recesses 42 and 43 which would tend to draw fluid along the valve member into the recesses. The cooperative action of all the above described means results in substantially segregating the valve area and the solenoid area, enabling both to work under favorable conditions.

The operation of the valve in a control system will now be described. When the system embodied in Fig. 1 is employed in connection with the operation of parts of machine tools and the like, the tripping switches 13 and 14 may be operated by any appropriate part of the machine with which the system is associated and in any sequence or cyclic frequency desired. It will be assumed that the tripping switch 13 is first closed in the cycle. This will energize solenoid 17 and through its pull upon plunger 63 quickly draw the valve member 44 to the left. This will connect the pressure fluid from pump 12 through line 27, passages 51, 52, 55, and 57, and line 35 to the chamber at the right of the piston 22 of motor 10. At the same time the fluid chamber at the left of the piston 22 will be connected through line 34, passages 56, 54, 53, and 58, and line 37 to the exhaust sump 25. If the switch 13 remains closed a sufficient length of time, the piston 22 will carry the rod 23 and striking piece 24 to the left a distance sufficient for the limit switch to be opened by the striking piece 24. This breaks the circuit from the power lead 16 through the switch 13. Upon deenergization of solenoid 17 the plunger expelling springs 73 will act to immediately move the valve member 44 toward the centralized position as shown in Fig. 3. This cuts off the flow of pressure fluid to the right side of piston 22 and at the same time closes off the exhaust from the left side of the piston. The piston will therefore be held stationary in this position until the tripping switch 14 is closed. When this takes place, the valve member 44 will similarly be moved to extreme right position where the fluid distribution passages will be suitably connected to reverse the flow of fluid to the motor 10 and carry the piston in the opposite direction until the engagement of striking piece 24 with the limit switch 21 produces the result of stopping the motor piston at its extreme right position and holding it fixed until it is started on its reverse movement by the operation of tripping switch 13.

It should be pointed out that the tripping switch brought into play must be held closed for the full travel time of the operating piston 22 of motor 10 in order to complete its stroke. If at any earlier time the tripping switch is opened, centralization of the pilot valve member 44 immediately takes place and the motor piston 22 is stopped at some position short of its full stroke. This characteristic may be availed of to control the positioning of the motor piston and the devices actuated thereby at one or more positions intermediate the limit of their full stroke.

When a balanced type of pilot valve which is to be actuated by solenoids disposed at opposite ends of the valve, is combined in a single unitary structure by constructing the valve element and the solenoid plungers in a single piece and the mounting of the solenoids rigidly in the valve casing, a device is obtained far superior to the association of these parts mounted separately.

According to this invention all the desirable qualities of separate construction are retained by the special method of forming the parts and arrangement of the complete assembly. In addition superior operating characteristics are obtained by restricting the bearing surface to the portion of the valve element engaged by the bore. Also centralization of the valve member by springs is made effective by employing valve head elements of greater width than the fluid distributing passages making it unnecessary for the valve to reach a dead central position before the fluid flow passages are disconnected and the fluid flow cut off.

While this invention is illustrated in but one form it is obvious that it is not limited to the form of construction shown but that it may be embodied in many other forms which fall within the spirit of the invention and the scope of the appended claims.

What I claim is:

1. A solenoid actuated valve comprising a casing having a cylindrical bore of uniform diameter, an actuating solenoid at the end of the bore and embodying a plunger receiving core passage of substantially the same diameter as the bore and alined with said bore, a unitary reciprocative valve member in said bore having an end portion extending into said core passage and forming the solenoid plunger, said valve member exclusive of the end portion being fitted to have surface contact with the bore, the end portion having a reduced diameter to provide surface clearance between it and the walls of said core passage whereby the bearing surface for the valve member is restricted to the portion having the full diameter.

2. A solenoid actuated valve comprising a casing having a cylindrical bore, a unitary valve member fitted to reciprocate in said bore and having ends extending beyond the ends of said bore, said ends of the member being formed as solenoid plungers for actuating the valve, solenoids secured at the opposite ends of said bore and each embodying a central sleeve for receiving one of said plungers, surface clearance being provided between the plunger ends and the walls of said central sleeve, whereby the bearing surface of the valve member is restricted to the bore engaging portion.

3. A solenoid structure comprising a hollow casing, a winding sleeve in said casing, a winding on said sleeve, insulating collars formed upon said sleeve to seat against opposite ends of said casing and serve as abutments for the opposite ends of said winding, the collar at one end of said winding having stems of insulating material formed integrally with the collar and extending outwardly through openings in said casing, said stems having embedded therein conductors which form terminals for said winding.

4. A structure for a solenoid actuated valve comprising a reciprocative valve member having an intermediate valve portion and terminal solenoid plunger portions, a pair of oppositely disposed operating solenoids each having a shell with a cylindrical outer surface, a casing having a bore in which said valve member is fitted and cylindrical recesses at the opposite ends of said bore, axially alined therewith and in which said solenoids are positioned to receive said plunger portions, said solenoid shells and said casing recesses being fitted together with metal to metal contact to facilitate heat conduction from the solenoid, and heat radiating fins at the casing surface adjacent the solenoid recesses to facilitate heat dissipation to the surrounding medium.

5. A solenoid actuated valve comprising a body structure having a bore, a cavity at the end of said bore, means for closing the outer end of said cavity, a solenoid having a plunger receiving aperture alined with said bore, a valve member reciprocable in said bore and having an end formed as a plunger, a portion of which is movable in and out of said cavity, a portion of said bore and cooperating valve element constituting a first pressure area, said end cavity including said solenoid and plunger constituting a second pressure area, a portion of said bore closed by said reciprocable valve member intervening between said areas, means for isolating said areas comprising a fluid drain cavity leading to said valve member in said intervening bore portion and means for connecting the cavity of the second area to atmosphere.

6. A solenoid actuated structure comprising a shell, a solenoid winding in the shell, a plunger including a portion magnetically attracted when the winding is energized and thereby drawn into the solenoid, an end secured to the shell carrying a stop for limiting the movement of the plunger, a housing for receiving the shell and including a wall opposite said end, and a yieldable member positioned between said end and said wall for cushioning the shell with respect to the housing.

7. A structure for a solenoid actuated valve comprising a reciprocative valve member having one portion formed as a valve element and another portion formed as a solenoid plunger, a solenoid for actuating said plunger and valve element and having a shell with a smooth outer surface, a casing having a guide in which said valve member is fitted and a recess in which said solenoid is fitted and positioned to receive said plunger portion, said solenoid shell being fitted in said casing recess with metal to metal contact to facilitate heat conduction from the solenoid, and heat radiating fins embodied in the casing surface adjacent to the solenoid to facilitate heat dissipation to the surrounding medium.

8. A solenoid actuated valve comprising a casing having a longitudinally extending bore, covers for the ends of said bore, an enlarged recess at each end of the bore adjacent to the cover, a solenoid fitted in each recess and held by the bore cover, each solenoid being provided with a core passage alined with said bore, a pole piece at the outer end of each passage, a unitary valve member fitted to reciprocate in said bore, the opposite ends of said member extending into the core passage of the respective solenoids to form plungers which serve to actuate the valve member.

9. A structure for a solenoid actuated valve comprising a longitudinally extending unitary cylindrical valve member having the intermediate portion thereof formed to embody balanced valve elements and the opposite end portions formed as solenoid plungers, a casing embodying a bore in which the valve portion of the member is fitted to reciprocate, a solenoid at each end of said bore having a central aperture alined with the bore for receiving one of the plunger ends of said valve member, a pole piece at the other end of each of said central apertures, an axial cavity at the outer end of each plunger portion, a seat in the end of each pole piece, a plunger expelling spring of substantially the same strength located in each cavity with one end seated in the seat of the corresponding pole piece and protected by said plunger and pole piece when said members are in abutting relation.

BENJAMIN NORTON FOSTER.